US012625977B2

(12) United States Patent
Williams et al.

(10) Patent No.: US 12,625,977 B2
(45) Date of Patent: *May 12, 2026

(54) SYSTEMS AND METHODS OF PERFORMING MACHINE LEARNING OPERATIONS USING SECURE ENCLAVES

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/680,289

(22) Filed: May 31, 2024

(65) Prior Publication Data

US 2024/0320348 A1     Sep. 26, 2024

Related U.S. Application Data

(63) Continuation-in-part of application No. 18/133,452, filed on Apr. 11, 2023, now Pat. No. 12,039,058,
(Continued)

(51) Int. Cl.
*G06F 21/60* (2013.01)
*G06F 9/50* (2006.01)
(Continued)

(52) U.S. Cl.
CPC .......... *G06F 21/602* (2013.01); *G06F 9/5027* (2013.01); *G06F 21/6245* (2013.01);
(Continued)

(58) Field of Classification Search
CPC ..... H04L 9/0894; H04L 9/083; H04L 9/0827; G06F 21/602; G06F 21/6245; G06F 9/5027
(Continued)

(56) References Cited

U.S. PATENT DOCUMENTS

| | | |
|---|---|---|
| 5,910,987 A | 6/1999 | Ginter et al. |
| 5,956,710 A | 9/1999 | Yarom |

(Continued)

OTHER PUBLICATIONS

NPL Search Terms (Year: 2025).*
(Continued)

*Primary Examiner* — Syed A Zaidi

(74) *Attorney, Agent, or Firm* — Carr & Ferrell LLP

(57)     ABSTRACT

Methods and systems for performing a machine learning operation on a server host using a secure enclave are provided. Exemplary methods include: receiving an encrypted service request from a client host, the client host encrypting a service request to produce the encrypted service request using a shared secret, the service request specifying the machine learning operation; decrypting, in a secure enclave that is established by a secure environment, the encrypted service request using the shared secret to produce a decrypted service request; performing the machine learning operation, in the secure enclave, using the decrypted service request to generate a service result; encrypting, in the secure enclave, the service result using the shared secret to create an encrypted service result; and providing the encrypted service result to the client host, the client host decrypting the encrypted service result using the shared secret.

24 Claims, 8 Drawing Sheets

500

ESTABLISH SHARED SECRET WITH CLIENT
510

RECEIVE ENCRYPTED SRVC REQUEST FROM CLIENT
520

DECRYPT ENCRYPTED SERVICE REQUEST
530

FULFILL SRVC REQUEST TO PRODUCE SRVC RESULT
540

ENCRYPT SERVICE RESULT
550

PROVIDE ENCRYPTED RESULT TO CLIENT
560

Related U.S. Application Data which is a continuation of application No. 17/074,217, filed on Oct. 19, 2020, now Pat. No. 11,704,416, which is a continuation of application No. 16/170,032, filed on Oct. 25, 2018, now Pat. No. 10,902,133.

(51) Int. Cl.
  *G06F 21/62* (2013.01)
  *H04L 9/08* (2006.01)
(52) U.S. Cl.
  CPC ............ *H04L 9/0827* (2013.01); *H04L 9/083* (2013.01); *H04L 9/0894* (2013.01)
(58) Field of Classification Search
  USPC ........................................................ 713/171
  See application file for complete search history.

(56) References Cited

U.S. PATENT DOCUMENTS

| | | | |
|---|---|---|---|
| 6,839,740 B1 | 1/2005 | Kiselev | |
| 7,203,801 B1 | 4/2007 | Sharma et al. | |
| 7,712,143 B2 | 5/2010 | Comlekoglu | |
| 8,869,294 B2 | 10/2014 | Sebot et al. | |
| 8,972,742 B2 | 3/2015 | Troncoso Pastoriza et al. | |
| 9,716,590 B2 | 7/2017 | Gentry | |
| 9,887,975 B1 | 2/2018 | Gifford et al. | |
| 10,902,133 B2 | 1/2021 | Williams et al. | |
| 11,704,416 B2 | 7/2023 | Williams et al. | |
| 12,039,058 B2 | 7/2024 | Williams et al. | |
| 2002/0073316 A1 | 6/2002 | Collins et al. | |
| 2003/0110388 A1 | 6/2003 | Pavlin et al. | |
| 2004/0068650 A1 | 4/2004 | Resnitzky | |
| 2005/0195975 A1 | 9/2005 | Kawakita | |
| 2008/0133935 A1 | 6/2008 | Elovici et al. | |
| 2009/0083546 A1 | 3/2009 | Staddon et al. | |
| 2009/0287837 A1 | 11/2009 | Felsher | |
| 2010/0241595 A1 | 9/2010 | Felsher | |
| 2010/0257372 A1 | 10/2010 | Seifert | |
| 2011/0110525 A1 | 5/2011 | Gentry | |
| 2012/0191933 A1* | 7/2012 | Zbiciak | G06F 12/1458 |
| | | | 711/163 |
| 2013/0148868 A1 | 6/2013 | Troncoso Pastoriza et al. | |
| 2013/0198526 A1 | 8/2013 | Goto | |
| 2014/0164758 A1 | 6/2014 | Ramamurthy et al. | |
| 2014/0195807 A1* | 7/2014 | Bar-El | H04L 9/0877 |
| | | | 713/168 |
| 2014/0281511 A1 | 9/2014 | Kaushik et al. | |
| 2015/0181433 A1 | 6/2015 | Li et al. | |
| 2015/0195258 A1 | 7/2015 | Kohlyama et al. | |
| 2015/0358153 A1 | 12/2015 | Gentry | |
| 2016/0036826 A1 | 2/2016 | Pogorelik et al. | |
| 2016/0087958 A1* | 3/2016 | Luo | H04L 63/0209 |
| | | | 713/168 |
| 2017/0185921 A1* | 6/2017 | Zhang | G06N 20/00 |
| 2018/0082050 A1 | 3/2018 | Flink et al. | |
| 2018/0089572 A1* | 3/2018 | Aili | G06F 9/453 |
| 2018/0089592 A1* | 3/2018 | Zeiler | G06N 20/00 |
| 2018/0212825 A1* | 7/2018 | Umbehocker | H04L 41/0806 |
| 2018/0349632 A1* | 12/2018 | Bent | H04L 9/008 |
| 2019/0354729 A1 | 11/2019 | Krawczewicz et al. | |
| 2020/0125563 A1 | 4/2020 | Fan et al. | |
| 2020/0134200 A1 | 4/2020 | Williams et al. | |
| 2021/0034765 A1 | 2/2021 | Williams et al. | |
| 2023/0244798 A1 | 8/2023 | Williams et al. | |

OTHER PUBLICATIONS

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

\* cited by examiner

120B

500

ESTABLISH SHARED SECRET WITH CLIENT
510

RECEIVE ENCRYPTED SRVC REQUEST FROM CLIENT
520

DECRYPT ENCRYPTED SERVICE REQUEST
530

FULFILL SRVC REQUEST TO PRODUCE SRVC RESULT
540

ENCRYPT SERVICE RESULT
550

PROVIDE ENCRYPTED RESULT TO CLIENT
560

600

| PROCESSOR 610 | OUTPUT DEVICES 650 |

| MEMORY 620 | INPUT DEVICES 660 |

| MASS STORAGE 630 | DISPLAY SYSTEM 670 |

| PORTABLE STORAGE 640 | PERIPHERALS 680 |

690

700

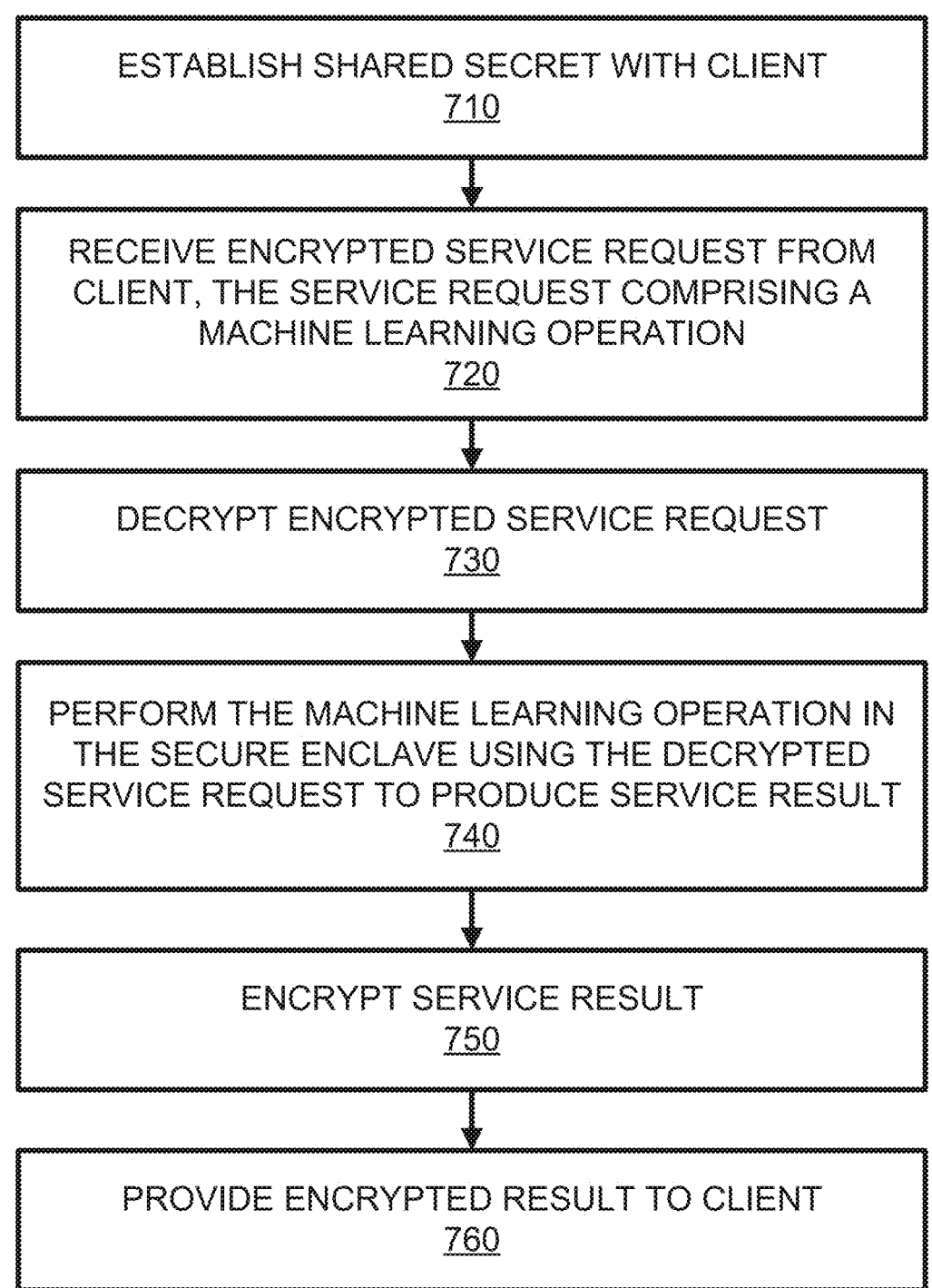

ESTABLISH SHARED SECRET WITH CLIENT
710

RECEIVE ENCRYPTED SERVICE REQUEST FROM
CLIENT, THE SERVICE REQUEST COMPRISING A
MACHINE LEARNING OPERATION
720

DECRYPT ENCRYPTED SERVICE REQUEST
730

PERFORM THE MACHINE LEARNING OPERATION IN
THE SECURE ENCLAVE USING THE DECRYPTED
SERVICE REQUEST TO PRODUCE SERVICE RESULT
740

ENCRYPT SERVICE RESULT
750

PROVIDE ENCRYPTED RESULT TO CLIENT
760

FIG. 7

SYSTEMS AND METHODS OF PERFORMING MACHINE LEARNING OPERATIONS USING SECURE ENCLAVES

CROSS-REFERENCE TO RELATED APPLICATIONS

The present application is a continuation-in-part application of U.S. patent application Ser. No. 18/133,452, filed on Apr. 11, 2023,now U.S. Pat. No. 12,039,058 issued on Jul. 16, 2024, and titled "Systems and Methods of Performing Computation Operations Using Secure Enclaves," which is a continuation of U.S. patent application Ser. No. 17/074, 217, filed on Oct. 19, 2020, now U.S. Pat. No. 11,704,416 issued on Jul. 18, 2023, and titled "Computational Operations in Enclave Computing Environments," which is a continuation of U.S. patent application Ser. No. 16/170,032, filed on Oct. 25, 2018, now U.S. Pat. No. 10,902,133 issued on Jan. 26, 2021, and titled "Computational Operations in Enclave Computing Environments," all of which are incorporated by reference herein in their entireties.

FIELD OF THE INVENTION

The present technology pertains to distributed computing systems and more specifically to security in distributed computing systems.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Encryption is the process of encoding a message or information in such a way that only authorized parties can access it and those who are not authorized cannot. Encryption does not by itself prevent interference, but denies the intelligible content to a would-be interceptor. In an encryption scheme, the intended information or message, referred to as plaintext, is encrypted using an encryption algorithm, referred to as a cipher, generating ciphertext that can only be read if decrypted. A cryptosystem is a pair (encryption and decryption) of algorithms that take a key and convert plaintext to ciphertext and back.

Encryption is used by militaries and governments to facilitate secret communication. It is also used to protect information within civilian systems. Encryption can be used to protect data "at rest," such as information stored on computers and storage devices. Encryption is also used to protect data in transit, for example, data being transferred via networks (e.g., the Internet, e-commerce), mobile telephones, Bluetooth devices and bank automatic teller machines (ATMs).

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods using enclave computing environments. Specifically, a method for performing computational operations on a server host may comprise: receiving an encrypted service request from a client host, the client host encrypting a service request to produce the encrypted service request using a shared secret, the service request specifying the computational operation; decrypting, in a secure enclave that is established by a secure environment, the encrypted service request using the shared secret to produce a decrypted service request, the secure enclave preventing other software running on the server host from accessing the shared secret and other data stored in the secure enclave; performing the computational operation, in the secure enclave, using the decrypted service request to generate a service result; encrypting, in the secure enclave, the service result using the shared secret to create an encrypted service result; and providing the encrypted service result to the client host, the client host decrypting the encrypted service result using the shared secret.

In some embodiments, systems and methods of performing machine learning operations using secure enclaves are provided. Specifically, a method for performing machine learning operations on a server host may comprise: receiving an encrypted service request from a client host, the client host encrypting a service request to produce the encrypted service request using a shared secret, the service request comprising the machine learning operation; decrypting, in a secure enclave that is established by a secure environment, the encrypted service request using the shared secret to produce a decrypted service request, the secure enclave preventing other software running on the server host from accessing the shared secret and other data stored in the secure enclave; performing the machine learning operation, in the secure enclave, using the decrypted service request to generate a service result; encrypting, in the secure enclave, the service result using the shared secret to create an encrypted service result; and providing the encrypted service result to the client host, the client host decrypting the encrypted service result using the shared secret.

BRIEF DESCRIPTION OF THE DRAWINGS

Embodiments are illustrated by way of example, and not by limitation, in the figures of the accompanying drawings, in which like references indicate similar elements and in which:

FIG. 7 is a simplified flow diagram of a method for performing machine learning operations in an enclave computing environment, according to various embodiments.

DETAILED DESCRIPTION

Figure 1:
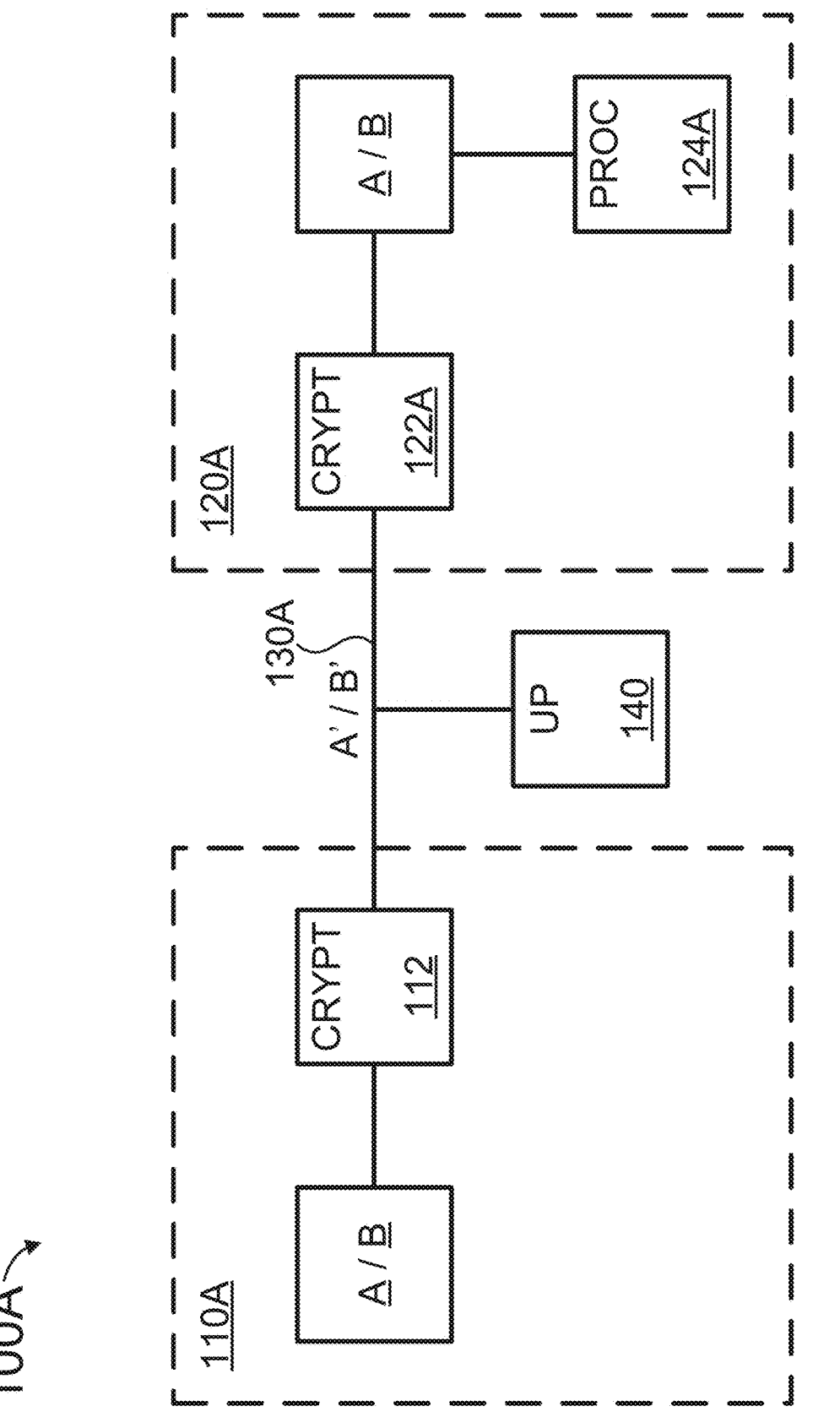
FIG. 1 is a simplified block diagram of a client-server architecture, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Some embodiments of the present technology include a distributed application structure that partitions tasks or workloads between the providers of a resource or service, called server hosts, and service requesters, called client hosts. The client hosts and server hosts can each be separate hardware systems (although both client and server may reside in the same system) and communicate over a computer network. A server host runs one or more server programs that share their resources with client hosts. A client host does not necessarily share any of its resources, but requests a server's content or service function. Client hosts can initiate communication sessions with server hosts that await incoming requests.

Various embodiments of the present technology include a pair of software programs, the server program and the client program. The server program runs on a server host, a computing device that can provide one or more of a Trusted Execution Environment (TEE), Remote Attestation (RA) capabilities, and the like. The server program can run within the TEE on the server host. The client program can run on the client host, which can be a computing device that does not necessarily have special requirements, such as a TEE.

FIG. 1 illustrates system 100A having a client-server architecture, according to some embodiments. System 100A can include client system (or host) 110A, server system (or host) 120A, communications link 130A, and unauthorized system (or host) 140. Client system 110A and server system 120A can include at least some of the characteristics of (physical and/or cloud-based) computing systems described further in relation to FIG. 6.

Server system 120A can be a physical computing system (e.g., hardware server) and/or virtualized computing environment (e.g., virtual machine, container, etc.). Virtualization is a foundational element of cloud computing. Virtual machines provide a substitute for a physical computing system and the functionality needed to execute entire operating systems. Virtual machines are created and run by a hypervisor that uses native execution to share and manage hardware, allowing for multiple environments that are isolated from one another, yet can exist on the same physical computing system.

Containers are an operating system-level virtualization method for deploying and running distributed applications without launching an entire virtual machine for each application. Containers can look like real computers from the point of view of programs running in them. Generally, a computer program running on an ordinary operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

Client system 110A can include cryptography engine 112. Server system 120A can include cryptography engine 122A and process 124A. Cryptography engine 112, cryptography engine 122A, and/or process 124A can include any of an application-specific integrated circuit (ASIC), field programmable gate array (FPGA), application-specific standard product (ASSP), an electronic circuit, system on a chip (SoC), a processor (shared, dedicated, or group), and the like that executes one or more software or firmware programs, a combinational logic circuit, and/or other suitable components that provide the described functionality.

Cryptography engine 112 can encrypt plaintext A to ciphertext A' using an encryption algorithm and an encryption key. Ciphertext A' can be sent from client system 110A to server system 120A over communications link 130A. Cryptography engine 122A can decrypt ciphertext A' to plaintext A using the encryption algorithm and a decryption key.

In symmetric-key encryption schemes, the encryption and decryption keys are the same. In symmetric-key encryption schemes, client system 110A and server system 120A should have the same key in order to achieve secure communication over communications link 130A. Examples of symmetric-key encryption schemes include: Twofish, Serpent, AES (Rijndael), Blowfish, CAST5, Kuznyechik, RC4, 3DES, Skipjack, Safer+/++(Bluetooth), and IDEA.

In public-key encryption schemes, the encryption key (public key) is published for anyone (e.g., client system 110A) to use and encrypt messages. However, only the receiving party (e.g., server system 120A) has access to the decryption key (private key) that enables messages to be read. Examples of public-key encryption schemes include: RSA, ElGamal, Elliptic Curve Cryptography (ECC), and Cramer-Shoup.

Process 124A can be any operation/analytic performed (or application that works) on information (e.g., plaintext A). For example, process 124A can be a database search, Internet search, financial transaction, ecommerce transaction, word processing application, spreadsheet application, and the like. Process 124A can produce plaintext result B, which is encrypted by Cryptography engine 122A to produce ciphertext B' using an encryption algorithm and an encryption key (e.g., same or different from the encryption algorithm and an encryption key used to produce ciphertext A'). Cryptography engine 112 can decrypt ciphertext B' to plaintext B using the (corresponding) encryption algorithm and a decryption key.

Although depicted as separate systems, client system 110A and server system 120A can be a single system where ciphertext (encrypted or encoded information) is created, stored, and (subsequently) converted back to plaintext (readable information). Communications link 130 can be various combinations and permutations of wired and wireless networks (e.g., Ethernet, Wi-Fi, Bluetooth, mobile broadband, the Internet, etc.), internal/external computer buses, and the like, such as described in relation to FIG. 6.

Unauthorized system 140 may intercept communications (e.g., data packets), such as ciphertext A' and/or B', over communications link 130A. Unauthorized system 140 can be controlled/operated by unauthorized party UP who is not authorized to receive communications from client system 110A or server system 120A, seeks to breach defenses and exploit weaknesses in system 100A, for example, for profit and information gathering. Ciphertext A' and/or B' are intended to be incomprehensible to unauthorized party BH (due to encryption). While communications between client system 110A or server system 120A can be protected in this way, information within server system 120A may be less secure.

Figure 2:
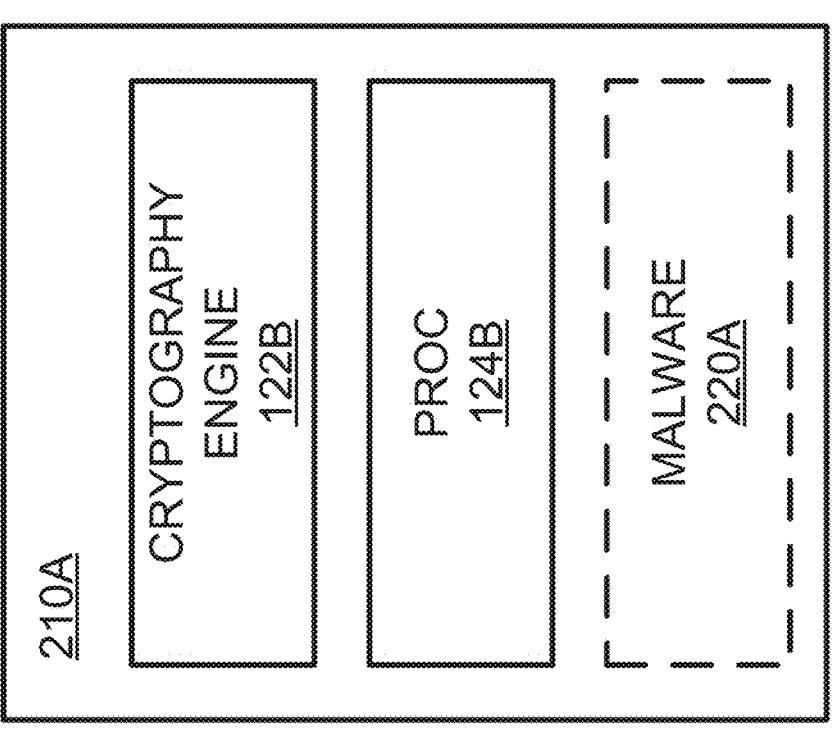
FIG. 2 is a simplified block diagram of a server system, according to various embodiments.
Figure 2:

FIG. 2 illustrates server system (or host) 120B according to various embodiments. Server system 120B can have at least some of the characteristics of server system 120A as described above in relation to FIG. 1. Server system 120B includes modules 210A, which can include programs (and associated data) stored in memory (and mass storage such as a hard disk, solid-state drive (SSD), flash memory, etc.) and executed (and used) by one or more processors (not depicted in FIG. 2) of server system 120B. For example, modules 210A can include cryptography engine 122B, process 124B, (optionally) malware 220A. Cryptography engine 122B and process 124B can have at least some of the characteristics of cryptography engine 122A and process 124A (respectively) as described above in relation to FIG. 1.

Malware 220A can be software (and/or or hardware) installed in server system 120B by an unauthorized party UP, who does not have authorization to access server system 120B. Unauthorized party UP can gain access to server system 120B to install malware 220A (among other activities) by exploiting weaknesses in the configuration of server system 120B (e.g., unchanged default passwords, failure to install updates, incorrect security/access settings, zero-day exploits, etc.), social engineering, phishing emails sent to authorized users, compromised webpages visited by authorized users, and the like. Since malware 220A operates within server system 120B, malware 220A can gain access to plain text A and/or B (FIG. 1), encryption and/or decryption keys, cryptography engine 122B (e.g., encryption and/or decryption methods), and process 124B (including database data).

By way of non-limiting example, malware 220A can be a spy-chip (circuit) inserted into server system 120C (e.g., in a motherboard of server system 120C) and have access to a processor(s) and memory (not depicted in FIG. 2) of server system 120C. Hence, a spy chip can manipulate system memory and inject code and/or instructions into system memory, which could then be executed by the processor, regardless of any software-level protection such as anti-malware technology. In addition, a spy chip can connect to the network and download instructions from a remote rogue server, thus creating a "backdoor entry" to server system 120C and hence to the enterprise and/or cloud network (not shown in FIG. 2).

Figure 3A:
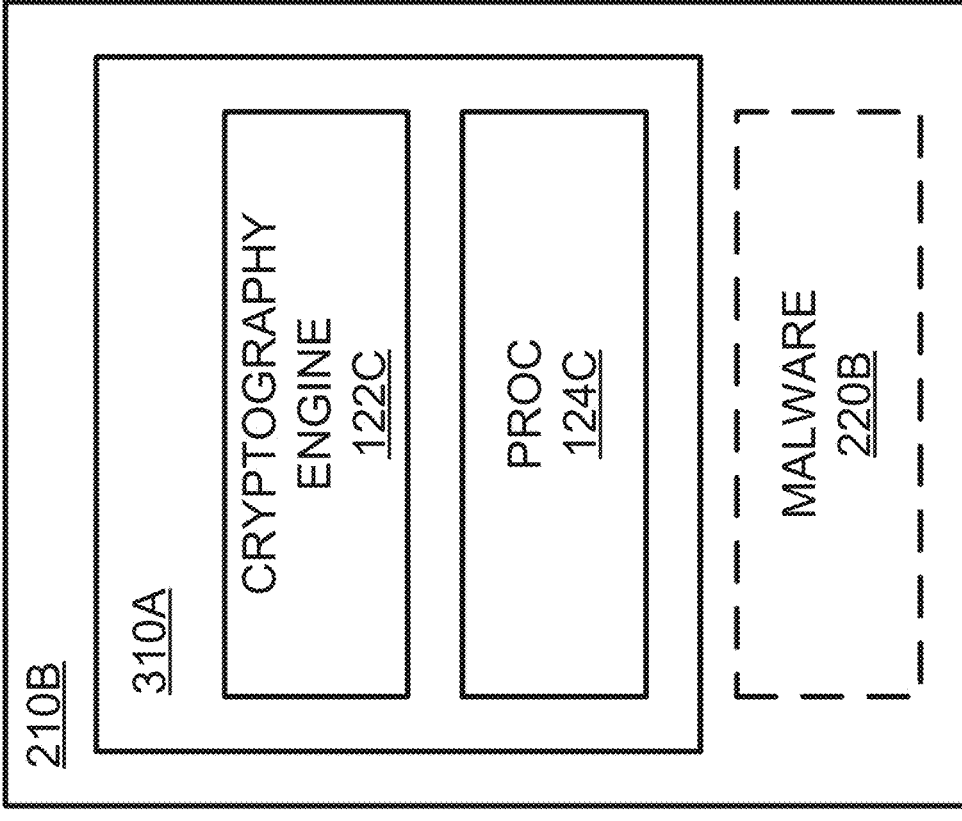
FIG. 3A is another simplified block diagram of a server system, in accordance with some embodiments.
Figure 3A:
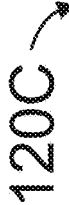

FIG. 3A illustrates server system (or host) 120C in accordance with some embodiments. Server system 120C can have at least some of the characteristics of server systems 120A and 120B as described above in relation to FIGS. 1 and 2, respectively. Server system 120B includes modules 210B, which can include programs (and associated data) stored in memory (and mass storage) and executed (and used) by one or more processors (not depicted in FIG.

3A) of server system 120B. For example, modules 210B can include cryptography engine 122C, process 124C, (optionally) malware 220B. Cryptography engine 122C, process 124C, and malware 220B can have at least some of the characteristics of cryptography engines 122A and 122B, and processes 124A and 124B, and malware 220B, as described above in relation to FIGS. 1 and 2.

Server system 120C can also include secure environment 310A. Secure environment 310A is a protected area of server system 120C. For example, the memory in which cryptography engine 122C and process 124C (including associated computer instructions and data) are stored is not accessible to other modules in server system 120C. Process 124C can process encrypted data that is decrypted by cryptography engine 122C only inside secure environment 310A. In this way, malware 220B cannot access/alter program information and data (e.g., plaintext, encryption/decryption keys, program code, etc.) of cryptography engine 122C and process 124C.

Secure environment 310A includes special-purpose hardware and/or software to produce a protected area. For example, secure environment includes an integrated circuit (e.g., processor, SoC, and the like) with special-purpose instructions to establish a secure enclave (referred hereinafter as a security processor). The special-purpose instructions allow user-level code to allocate private regions of memory, called secure enclaves, that are protected from processes running at higher privilege levels. In other words, secure enclaves can be regions of memory (such as memory inside the security processor) that are cordoned off to run code that the operating system (and/or hypervisor, processor System Management Mode (SMM), direct memory access (DMA) from peripherals, etc.) on server system 120C cannot access and/or change. The secure enclave creates a safe haven for sensitive program and/or data, even if malware 220B or another malady compromises server system 120C. In some embodiments, the security processor incorporates cryptography engine 122C.

By way of non-limiting example, the security processor is separate from the main processor (e.g., application processor). By way of additional non-limiting example, secure environment includes a (special-purpose) operating system that runs on the security processor separate from the main processor (e.g., application processor). By way of further non-limiting example, server system 120C includes support for secure environment 310A (security processor) in the Basic Input/Output System (system BIOS). System BIOS is non-volatile firmware used to perform hardware initialization during the booting process (power-on startup), and to provide runtime services for operating systems and programs. Server system 120C can be physical (e.g., a hardware server) and/or virtualized (e.g., virtual machine, container, and the like) computing environments.

By way of non-limiting example, secure environment 310A (security processor) can include a unique key (e.g., 64-bits to 1,024 bits long) peculiar to each instance of secure environment 310A (security processor) and which is used to generate cryptographic keys inside secure environment 310A (security processor). By way of further non-limiting example, security processor can include a (dedicated) memory encryption/decryption engine for encrypting/decrypting data stored in memory external to the security processor (e.g., main memory, external memory caches, and the like) and in mass storage (e.g., hard disk, solid-state drive (SSD), flash memory, etc.). By way of additional non-limiting example, secure environment 310A (security processor) can perform various cryptographic algorithms, such as (by way of non-limiting example) SHA-256, RSA-3072, RSA-2048, Elliptic Curve Digital Signature Algorithm (ECDSA), Elliptic-curve Diffie-Hellman (ECDH) (key-agreement protocol), Advanced Encryption Standard-Galois/Counter Mode (AES-GCM), Advanced Encryption Standard-Cipher-based Message Authentication Code (AES-CMAC), AES-CTR, custom cryptographic algorithms (e.g., Carter-Wegman message authentication code (MAC) combined with AES-CTR), and the like.

By way of non-limiting example, secure environment 310A (security processor) may include one or more of: AMD Platform Security Processor (PSP) (also known as AMD Secure Technology), AMD Secure Execution Environment, ARM TrustZone, Intel Trusted Execution Technology (Intel TXT), Intel SGX Software Guard Extensions, and the like.

Figure 3B:
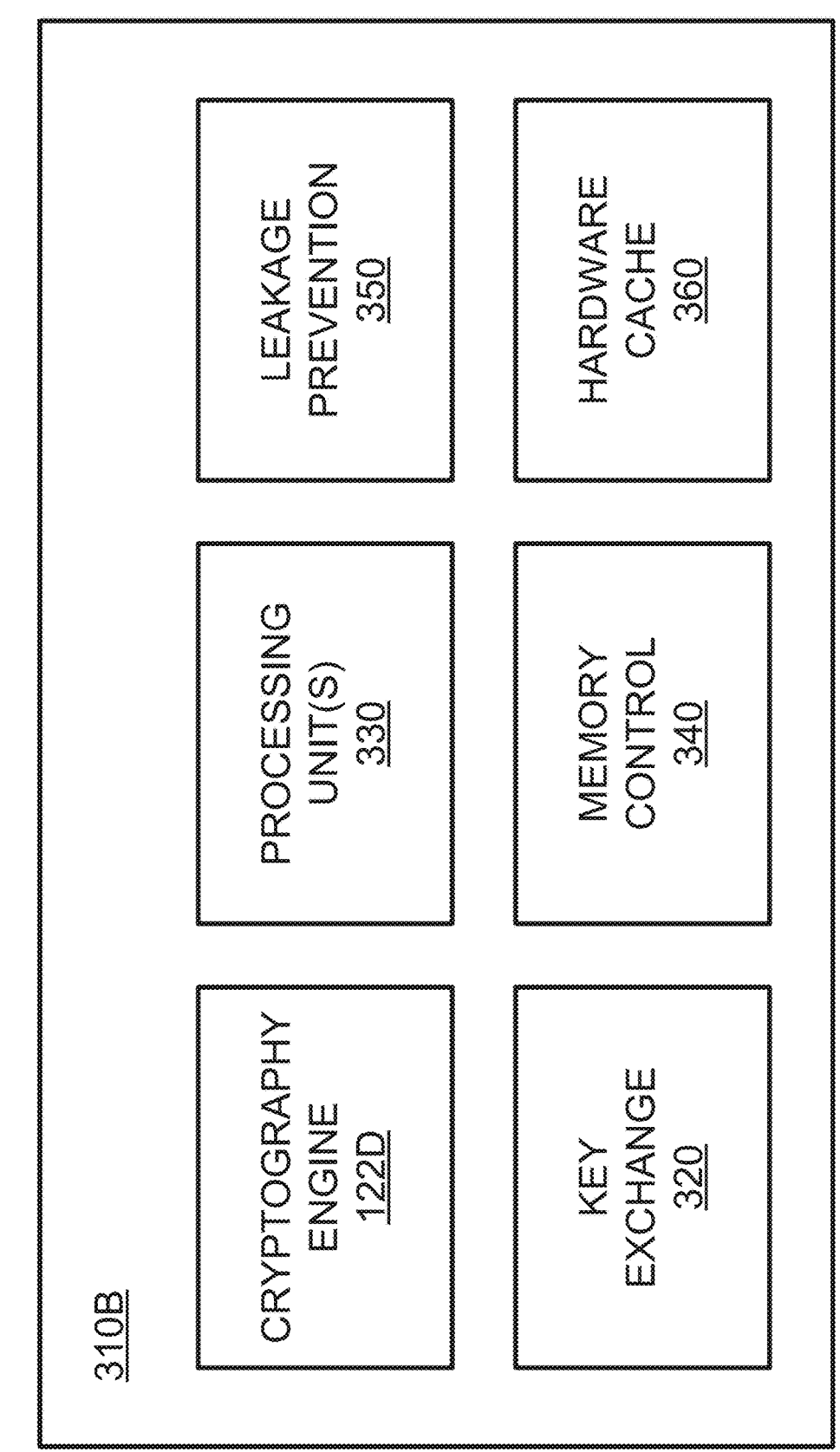
FIG. 3B is a simplified block diagram of a secure environment, in accordance with various embodiments.

FIG. 3B is a simplified block diagram of a secure environment 310B. FIG. 3B illustrates modules 210C in accordance with various embodiments. Modules 210C can have at least some of the characteristics of modules 210A and 210B as described above in relation to FIGS. 2 and 3A, respectively. Modules 210C can include cryptography engine 122D, key exchange 320, processing unit(s) 330, memory control 340, leakage prevention 350, and cache 360. Cryptography engine 122D can have at least some characteristics of cryptography engine 122A, 122B, and 122C as was described above in relation to FIGS. 1, 2, and 3A, respectively.

Key exchange 320 can perform key exchange on the server system side (e.g., server system 120A and 120B). Key exchange is when cryptographic keys are exchanged between two parties, allowing use of a cryptographic technique(s). Processing unit(s) 330 can be physical and/or logical core(s), which carry out the instructions of a computer program by performing the basic arithmetic, logical, control, and input/output (I/O) operations specified by the instructions.

Alternatively or additionally, key exchange 320—in lieu of using a two-party cryptographic key exchange algorithm to establish a shared secret—can use a trusted third party to choose the secret and provide it to both the client system (e.g., client system 110A in FIG. 1) and server system (e.g., server system 120A). This third party may be the same server system as the one used to establish trust between the client system and the secure environment (e.g., secure environment 310A in FIG. 3A) such as a remote attestation server, or a different server. Here, a remote attestation server can—in addition to providing the shared secret-authenticate the hardware and software configuration of the server system. The client system can contact/challenge the remote attestation server to determine the level of trust in the integrity of the server system.

Memory control 340 can set aside a special memory region (secure enclave), which is protected from memory access (e.g., by the kernel, hypervisor, management engine, and direct memory access (DMA) accesses from peripherals) except by the program using the special memory region. By way of non-limiting example, memory control 340 can perform address translation to isolate the secure enclave from less privileged pieces of software (e.g., applications and operating systems).

Secure enclaves can prevent other processes running on the same hardware from observing the contents of the operations executed in the secure enclave, or the contents of the secure enclave's memory. However, information about what the secure enclave process (e.g., process 124C in FIG.

3A) is doing can still be leaked through so-called "side-channels," such as timing and page leakage.

Other processes (e.g., malware 220B in FIG. 3A) may measure the time the secure enclave takes to perform an operation. If the secure enclave operation takes different amounts of time to complete when different conditions are met, then the other processes may infer the status of those conditions from this time. By way of non-limiting example, a secure enclave process may be performing a search for a desired term over some input data (e.g., process 124C in FIG. 3A). If the secure enclave process copies only matching records from the data set into an output buffer, other processes may be able to do a statistical analysis over many calls to the secure enclave process to infer how many matching records each call had, based on the additional time taken by the copy.

Leakage prevention 350 can ensure that each call into the enclave takes the same amount of time, regardless of the conditions under which the process is called. In some embodiments, leakage prevention 350 can represent improvements to process 124C (FIG. 3A). By way of non-limiting example, when processing the search above, the secure enclave process (e.g., process 124C in FIG. 3A) would copy data for each data item scanned; if the item was a match it would copy the item itself, otherwise it would copy a dummy data block of the same size.

Other processes (e.g., malware 220B in FIG. 3A) may observe which memory pages are accessed by the secure enclave process (e.g., process 124C in FIG. 3A), even if they cannot read the contents of the memory page. If the enclave operation accesses memory pages in different patterns when different conditions are met, then the other processes may infer the status of those conditions from the access pattern. By way of non-limiting example, if the secure enclave process is a database query covering several tables, and if indexes covering those tables are stored in different segments of memory and accessed during the processing of the query, then the other processes may infer which columns or constraints were present in the query by observing which segments of memory are accessed.

Leakage prevention 350 can ensure all memory accesses are performed using a technique known as Oblivious RAM (ORAM). This technique passes all memory accesses through a data structure that randomly shuffles memory blocks while performing each read or write, in such a way that an outside observer cannot tell which block was accessed without being able to decrypt their contents. In various embodiments, leakage prevention 350 can represent improvements to process 124C (FIG. 3A), memory control 340, and the like.

Cache 360 can be a hardware cache memory which can be used by processing unit(s) 330 to store code and data for programs (e.g., process 124C in FIG. 3A) using a secure enclave. As described above, modules 210C can be various combinations and permutations of hardware (e.g., integrated circuits) and software.

Figure 4:
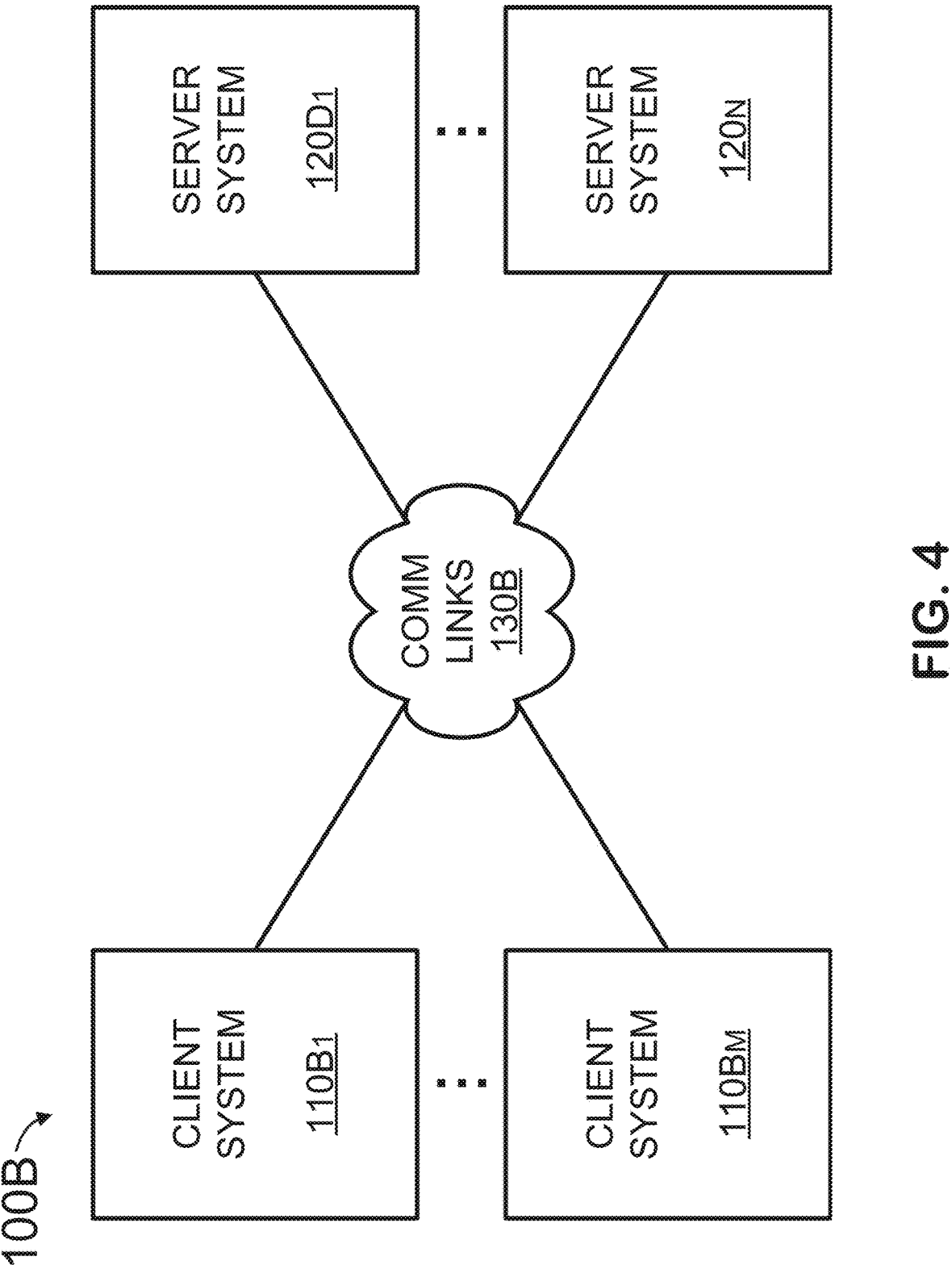
FIG. 4 is another simplified block diagram of a client-server architecture, according to some embodiments.

FIG. 4 depicts system 100B for computational operations in (distributed) enclave computing environments, according to some embodiments. System 100B can include one or more client systems $110B_1$-$110B_M$, one or more server systems $120D_1$-$120_N$, and communications links 130B. One or more client systems $110B_1$-$110B_M$ and one or more server systems $120D_1$-$120_N$ can (individually) be disposed in the same and/or different locations (e.g., offices, data centers, cities, counties, geographic regions, countries, continents, etc.). Additionally or alternatively, one or more client systems $110B_1$-$110B_M$ and one or more server systems $120D_1$-

$120_N$ can (individually) be in varied computing environments, including shared computing architectures, hybrid architectures, distinct architectures (e.g., cloud computing environments), and combinations thereof. One or more client systems $110B_1$-$110B_M$ and one or more server systems $120D_1$-$120_N$ can include at least some of the characteristics of client system 110A (FIG. 1) and server system 120C (FIG. 3A), respectively.

Figure 6:
FIG. 6 is a simplified block diagram of a computing system, according to some embodiments.

Communications links 130B can be various combinations and permutations of wired and wireless networks (e.g., Ethernet, Wi-Fi, Bluetooth, mobile broadband, the Internet, etc.), internal/external computer buses, and the like, such as described in relation to FIG. 6. Although depicted as a single "block," communications links 130B can be, for example, multiple distinct/separate combinations and permutations of wired and wireless networks, internal/external computer buses, and the like. Communications links 130B can have at least some of the characteristics of communications link 130A as described above in relation to FIG. 1.

Figure 5:
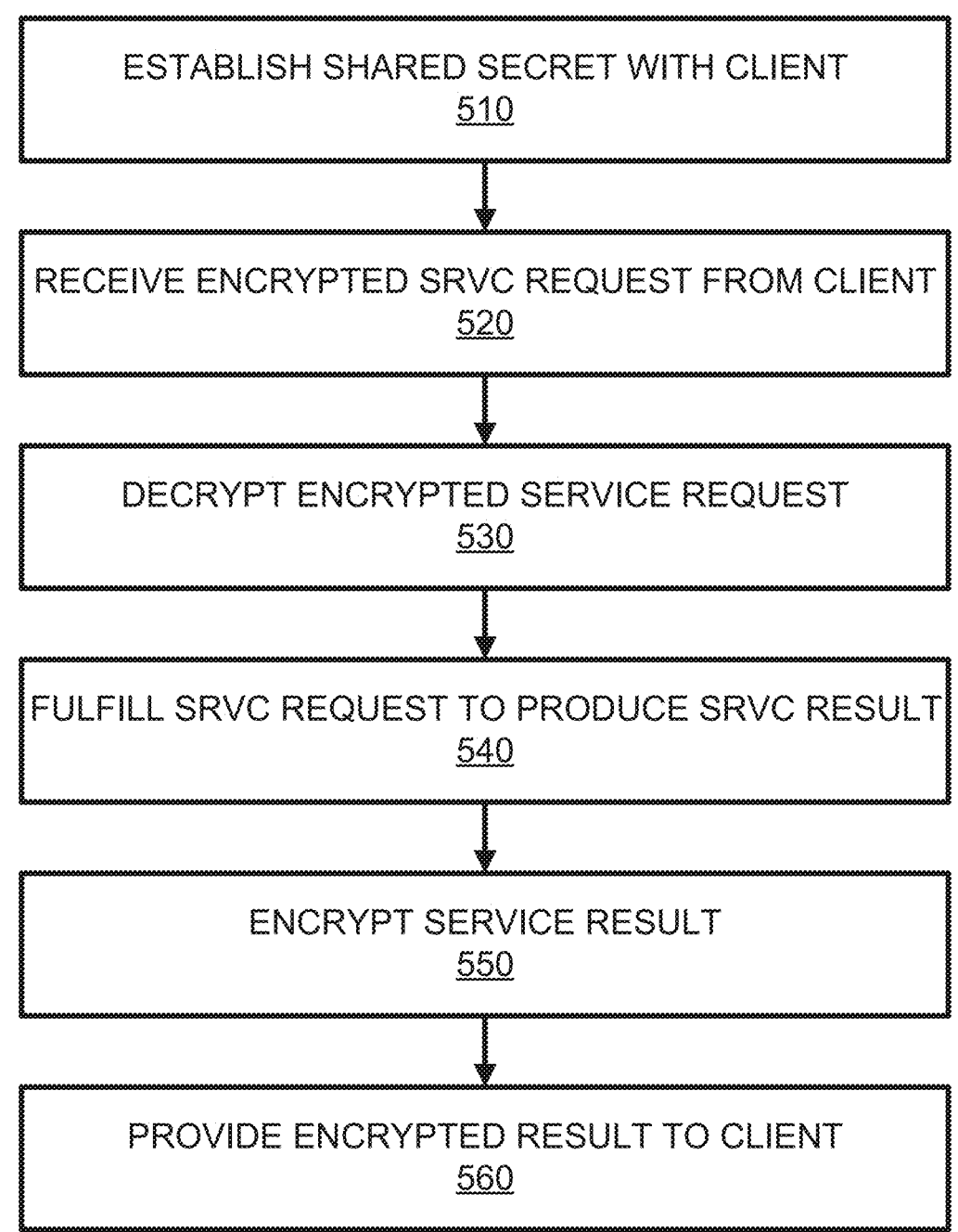
FIG. 5 is a simplified flow diagram of a method for performing computational operations in an enclave computing environment, according to various embodiments.

FIG. 5 illustrates method 500 for performing computational operations in an enclave computing environment. According to some embodiments, method 500 can be performed by system 100B (FIG. 4). Method 500 can commence at step 510, where a server system (e.g., one or more of server systems $120D_1$-$120_N$) can establish a shared secret with a client system (e.g., one or more of client systems $110B_1$-$110B_M$). A shared secret is a piece of data-known only to the server system and the client system (parties involved)—in a secure communication. For example, the shared secret can be a password, a passphrase, a big number, an array of randomly chosen bytes, and the like.

In various embodiments, the shared secret can be provided to the server system and the client system in a secure manner by a third-party key broker or service. According to some embodiments, the shared secret can be established through direct exchange between the server system and the client system (e.g., using symmetric and/or asymmetric key systems). By way of non-limiting example, the shared secret can be established using the Diffie-Hellman key exchange (DHKE), such as that used by the Intel Software Guard Extensions (SGX) attestation process.

The server system can detect and decrypt from among multiple specific encryption methods used and/or specified by the client system when the shared secret is established. The server system can decrypt service requests (step 530), perform the search or computational operation (step 540), and encrypt the service result (step 550) using the encryption method specified by the client system.

At step 520, an encrypted service request can be received from the client system. In some embodiments, the encrypted service request is a search request or a computational operation request such as an analytic, which is encrypted by the client system using the shared secret as the encryption key. The encrypted service request is received by the server system from the client system as an encrypted message.

At step 530, the server system passes the encrypted service request to the secure environment (e.g., secure environment 310A (FIG. 3A), which decrypts the encrypted message using the shared secret.

At step 540, a computation operation can be performed within the secure environment using the decrypted service request. According to various embodiments, the server system performs the computational operation specified by the service request within the secure environment and produces the service result (result of performing the search or analytic). The data over which the service request is processed can be encrypted, unencrypted, or a combination thereof.

When the data is encrypted, the data may (only) be decrypted within the secure environment as the service request is evaluated.

At step 550, the service result is encrypted. In some embodiments, the server system encrypts the service results using the shared secret within the secure environment.

At step 560, the encrypted service results can be provided to the client system. In various embodiments, the encrypted service results are sent from the server system to the client system as an encrypted message. In accordance with some embodiments, the client system receives the encrypted service result from the server system and decrypts the encrypted service result using the shared secret to obtain the results of its service request.

In various embodiments, other software (e.g., malware 220B in FIG. 3A) running on the server system (e.g., one or more of server systems $120D_1$-$120_N$ in FIG. 4) may still be able to observe when programs/modules inside the secure environment (secure environment 310A (FIG. 3A) read (and/or write) data from (and/or to) memory or mass storage. The programs/modules inside the secure environment can process (all) service requests of the same type using the same pattern and timing of memory and mass storage (outside of the secure environment) accesses, to avoid leaking (limit the amount of observable) information about the contents of the service request and/or its result.

The systems and methods of the present technology are an improvement to computer-related technology. For example, the systems and methods of the present technology provide a technical solution to the security problems posed by malware on server systems/hosts.

FIG. 6 depicts an exemplary computer system (or computing system) 600 that may be used to implement some embodiments of the present invention. The computer system 600 in FIG. 6 may be implemented in the contexts of the likes of computing systems, networks, servers, or combinations thereof. The computer system 600 in FIG. 6 includes processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 includes a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

The components provided in the computer system 600 in FIG. 6 are those typically found in computer systems that may be suitable for use with embodiments of the present disclosure and are intended to represent a broad category of such computer components that are well known in the art. Thus, the computer system 600 in FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 600 may be implemented as a cloud-based computing environment, such as a virtual machine and/or container operating within a computing cloud. In other embodiments, the computing system 600 may itself include a cloud-based computing environment, where the functionalities of the computing system 600 are executed in a distributed fashion. Thus, the computing system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Nonvolatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

The methods and systems described herein can be used for performing machine learning operations in secure enclaves. FIG. 7 illustrates a method 700 for performing machine learning operations in a secure enclave computing environment. It will be understood that the order of the steps disclosed in the various methods herein are not intended to be limiting, unless specifically claimed as such. Thus, various steps can be omitted or their order of operations rearranged as would be apparent to one of ordinary skill in the art. Furthermore, it will be appreciated that the machine learning operations and processes described herein can be implemented utilizing the systems as described herein or the systems depicted in any of the accompanying figures, including but not limited to FIGS. 1-4 and FIG. 6.

As mentioned earlier herein, secure enclaves are private regions of memory that are protected from processes running at higher privilege levels. Specifically, the secure environment 310A (FIG. 3A) includes special-purpose hardware and/or software to produce a protected area. For example, secure environment includes an integrated circuit (e.g., processor, SoC, and the like) with special-purpose instructions to establish the secure enclave (referred hereinafter as a security processor). The special-purpose instructions allow user-level code to allocate secure enclaves. In other words, secure enclaves can be regions of memory (such as memory inside the security processor) that are cordoned off to run code that the operating system (and/or hypervisor, processor System Management Mode (SMM), direct memory access (DMA) from peripherals, etc.) on server system 120C cannot access and/or change. The secure enclave creates a safe haven for sensitive program and/or data.

In some embodiments, the machine learning operation to be performed in the secure enclave computing environment comprises a machine learning training process of a machine learning model. The machine learning training operation can include training a machine learning model using one or more data sets. The one or more data sets may reside on the server host, the client host, or any combination of the server host and the client host.

Exemplary examples of machine learning models include, but are not limited to, regression models, decision tree models, large language models, and neural network models. These machine learning models (which may sometimes be referred to as machine learning analytic models) can be represented as machine executable code or using other representations including higher level languages. The machine learning models can take different forms depending upon the particular machine learning algorithm being used. The machine learning models can contain data structures, including but not limited to vectors of weights for a neural network or a tree of features and splits for a decision tree. A machine learning model can include at least one machine learning data structure that is generated based on a trained machine learning model. Further details about exemplary machine learning models can be found in U.S. patent application Ser. No. 17/473,778, filed on Sep. 13, 2021, now U.S. Pat. No. 11,902,413 issued Feb. 13, 2024, and titled "Secure Machine Learning Analytics Using Homomorphic Encryption", which is incorporated by reference in its entirety herein.

In further embodiments, the machine learning operation to be performed in the secure enclave computing environment comprises a machine learning model evaluation of a trained machine learning model against a data set. Again, the data set can reside on the server host, the client host, or a combination of the server host and the client host.

Now referring to FIG. 7, according to some embodiments, method 700 can be performed by system 100B (FIG. 4). Method 700 can commence at step 710, where a server system (e.g., one or more of server systems $120D_1$-$120_N$) can establish a shared secret with a client system (e.g., one or more of client systems $110B_1$-$110B_M$). A shared secret is a piece of data—known only to the server system and the client system (parties involved)—in a secure communication. For example, the shared secret can be a password, a passphrase, a big number, an array of randomly chosen bytes, and the like.

In various embodiments, the shared secret can be provided to the server system and the client system in a secure manner by a third-party key broker or service. According to some embodiments, the shared secret can be established through direct exchange between the server system and the client system (e.g., using symmetric and/or asymmetric key systems). By way of non-limiting example, the shared secret can be established using the Diffie-Hellmann key exchange (DHKE), such as used by the Intel Software Guard Extensions (SGX) attestation process.

The server system can detect and decrypt from among multiple specific encryption methods used and/or specified by the client system when the shared secret is established. The server system can decrypt service requests (step 730), perform the search or a machine learning operation (step 740), and encrypt the service result (step 750) using the encryption method specified by the client system.

At step 720, an encrypted service request can be received from the client system. In some embodiments, the encrypted service request is a search request or a machine learning operation request such as an analytic, which is encrypted by the client system using the shared secret as the encryption key. The encrypted service request is received by the server system from the client system as an encrypted message.

At step 730, the server system passes the encrypted service request to the secure environment (e.g., secure environment 310A (FIG. 3A), which decrypts the encrypted message using the shared secret.

At step 740, a machine learning operation can be performed within the secure environment using the decrypted service request. According to various embodiments, the server system performs the machine learning operation specified by the service request within the secure environment and produces the service result (result of performing the search or analytic). The data over which the service request is processed can be encrypted, unencrypted, or a combination thereof. When the data is encrypted, the data may (only) be decrypted within the secure environment as the service request is evaluated.

At step 750, the service result is encrypted. In some embodiments, the server system encrypts the service results using the shared secret within the secure environment.

At step 760, the encrypted service results can be provided to the client system. In various embodiments, the encrypted service results are sent from the server system to the client system as an encrypted message. In accordance with some embodiments, the client system receives the encrypted service result from the server system and decrypts the encrypted service result using the shared secret to obtain the results of its service request.

In some embodiments, the method 700 includes feeding or providing examples to train or update a database and/or a machine learning model in the secure enclave. As mentioned before, a database in the secure enclave computing environment can be used to execute database inquiries or database searches on one or more tables.

The examples (or inputs) for training or updating the machine learning model in the secure enclave include, but are not limited to, the following: (a) training data fed to the secure enclave computing environment; (b) examples generated by a trained machine learning model (e.g., a regression model, a decision tree model, a neural network model, a GenerativeAI model, or a large language model); and (c) examples generated by a trained machine learning model, where the trained machine learning model has been trained based on past service results. In these cases, the outputs of the machine learning process in the secure enclave would be an updated machine learning model incorporating information learned from the inputs. This updated model can be used directly or can be used as the input to future service requests.

In some embodiments, the method 700 includes training a machine learning model in the secure enclave and then evaluating the trained machine learning model against a data set. Once trained, the trained machine learning model can be utilized in the secure enclave computing environment, or the trained machine learning model can be transmitted to a different computing environment altogether.

In further embodiments, if at step 720 the encrypted service request is determined to be an ambiguous request or prompt (such as an ambiguous search request), the method 700 proceeds with step 730 (decrypting the encrypted service request in the secure enclave), as set forth above. Then, at step 740, a machine learning operation can be performed within the secure environment using the decrypted service request. The decrypted service request can be disambiguated using machine learning techniques or a trained machine learning model, so as to provide a more useful decrypted service request for the client. Then, the method 700 proceeds with steps 750 and 760 as set forth above.

As shown above, machine learning can be utilized to update or improve service requests or prompts in the enclave, thereby improving the quality of both service requests and service results (e.g., search results). The systems and methods as provided herein demonstrate how machine learning can be used in secure enclave computing environments, so as to provide improved service results to clients in a safe and secure manner.

What is claimed is:

1. A method for performing a machine learning operation on a server host, the method comprising:

receiving an encrypted service request from a client host, the client host encrypting a service request to produce the encrypted service request using a shared secret, the service request comprising a machine learning operation;

decrypting, in a secure enclave that is established by a secure environment, the encrypted service request using the shared secret to produce a decrypted service request, the secure enclave preventing other software running on the server host from accessing the shared secret and other data stored in the secure enclave, the secure enclave being protected from processes running at higher privilege levels;

performing the machine learning operation, in the secure enclave, using the decrypted service request to generate a service result;

encrypting, in the secure enclave, the service result using the shared secret to create an encrypted service result; and providing the encrypted service result to the client host, the client host decrypting the encrypted service result using the shared secret.

2. The method of claim 1, wherein the machine learning operation comprises a machine learning training process of a machine learning model.

3. The method of claim 1, wherein the machine learning training operation comprises training a machine learning model using one or more data sets, the one or more data sets residing on the server host, the client host, or a combination of the server host and the client host.

4. The method of claim 1, wherein the machine learning operation comprises a machine learning model evaluation of a trained machine learning model against a data set, the data set residing on the server host, the client host, or a combination of the server host and the client host.

5. The method of claim 1, wherein the secure enclave encrypts data written to a mass storage device by the performing the machine learning operation.

6. The method of claim 1, wherein a memory space is established using special-purpose instructions of a processor of the server host.

7. The method of claim 1, further comprising providing examples to train or update a database in the secure enclave.

8. The method of claim 1, further comprising providing examples to train or update a machine learning model in the secure enclave, thereby producing a trained machine learning model.

9. The method of claim 8, further comprising evaluating the trained machine learning model against a data set.

10. The method of claim 1, further comprising disambiguating the decrypted service request utilizing machine learning.

11. The method of claim 1, wherein the secure environment establishes the secure enclave using special-purpose instructions.

12. The method of claim 1, wherein data over which the service request is processed is one of encrypted data, unencrypted data, and a combination of encrypted and unencrypted data.

13. A system for performing a machine learning operation on a server host, the system comprising:

a processor; and a memory coupled to the processor and storing a program executable by the processor to perform a method comprising:

receiving an encrypted service request from a client host, the client host encrypting a service request to produce the encrypted service request using a shared secret, the service request comprising the machine learning operation;

decrypting, in a secure enclave that is established by a secure environment, the encrypted service request using the shared secret to produce a decrypted service request, the secure enclave preventing other software running on the server host from accessing the shared secret and other data stored in the secure enclave, the secure enclave being protected from processes running at higher privilege levels;

performing the machine learning operation, in the secure enclave, using the decrypted service request to generate a service result;

encrypting, in the secure enclave, the service result using the shared secret to create an encrypted service result; and providing the encrypted service result to the client host, the client host decrypting the encrypted service result using the shared secret.

14. The system of claim 13, wherein the machine learning operation comprises a machine learning training process of a machine learning model.

15. The system of claim 13, wherein the machine learning training operation comprises training a machine learning model using one or more data sets, the one or more data sets residing on the server host, the client host, or a combination of the server host and the client host.

16. The system of claim 13, wherein the machine learning operation comprises a machine learning model evaluation of a trained machine learning model against a data set, the data set residing on the server host, the client host, or a combination of the server host and the client host.

17. The system of claim 13, wherein the secure enclave encrypts data written to a mass storage device by the performing the machine learning operation.

18. The system of claim 13, wherein a memory space is established using special-purpose instructions of a processor of the server host.

19. The system of claim 13, wherein the method further comprises providing examples to train or update a database in the secure enclave.

20. The system of claim 13, wherein the method further comprises providing examples to train or update a machine learning model in the secure enclave, thereby producing a trained machine learning model.

21. The system of claim 20, wherein the method further comprises evaluating the trained machine learning model against a data set.

22. The system of claim 13, wherein the method further comprises disambiguating the decrypted service request utilizing machine learning.

23. The system of claim 13, wherein the secure environment establishes the secure enclave using special-purpose instructions.

24. The system of claim 13, wherein data over which the service request is processed is one of encrypted data, unencrypted data, and a combination of encrypted and unencrypted data.

* * * * *